June 14, 1932.  J. S. BELT  1,863,263
PROCESS OF AND MEANS FOR PRODUCING SOLID CARBON DIOXIDE
Original Filed May 21, 1929   2 Sheets-Sheet 1

Joseph S. Belt,
INVENTOR.

BY J. Stanley Burch
ATTORNEY.

June 14, 1932.    J. S. BELT    1,863,263
PROCESS OF AND MEANS FOR PRODUCING SOLID CARBON DIOXIDE
Original Filed May 21, 1929    2 Sheets-Sheet 2
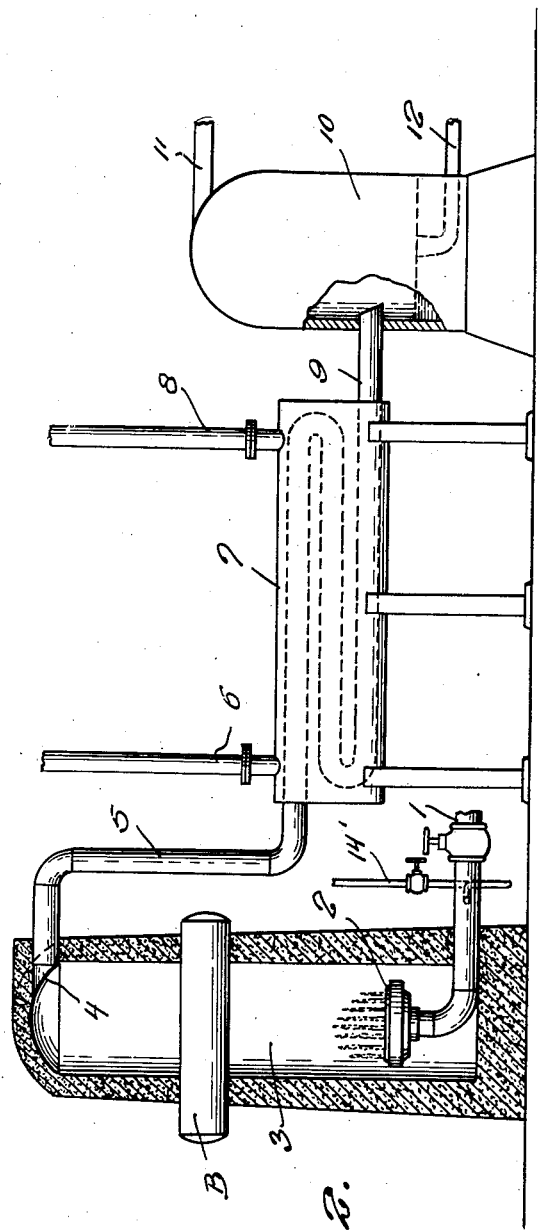
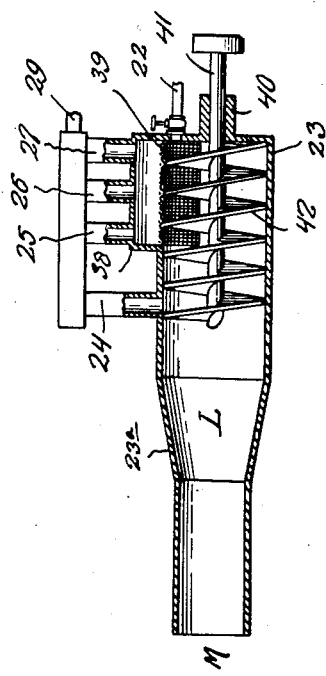
Joseph S. Belt,
INVENTOR.
BY J. Stanley Busch
ATTORNEY.

Patented June 14, 1932

1,863,263

UNITED STATES PATENT OFFICE

JOSEPH S. BELT, OF AMARILLO, TEXAS

PROCESS OF AND MEANS FOR PRODUCING SOLID CARBON DIOXIDE

Original application filed May 21, 1929, Serial No. 364,890. Divided and this application filed December 27, 1929. Serial No. 416,928.

The present application is a division of my copending application for patent upon process of and means for separating and utilizing constituents of natural gas, Serial No. 364,890, filed May 21, 1929.

This invention relates to that part of the above process and means pertaining to production of solid carbon dioxide from natural gas, and particularly aims to burn natural gas and recover the carbon dioxide and inert gases occasioned by the burning, and to separate the carbon dioxide from the inert gases by solidifying the carbon dioxide into dry ice or solid $CO_2$.

In the processes heretofore practiced, natural gas has been liquified as a whole or without any physical change or transition, and the elements or constituents desired have then been obtained or separated by fractional distillation of the liquids. The results of these prior processes have been more or less unsatisfactory, and in carrying them out it has been necessary to use special care and skill as well as to provide complicated and expensive equipment.

The principal object of the present invention, therefore, is to simplify and improve processes and apparatus for producing solid carbon dioxide from natural gas, and to greatly facilitate the production thereof with uniform improved results, and by means of inexpensive simple equipment requiring little care or skilled attention. I accomplish this object, generally speaking, by first changing the identity of the hydrocarbon compounds in the gas by burning the latter to convert them into carbon dioxide, then solidifying the carbon dioxide to effect a riddance of the hydrocarbon compounds from the original volume resulting from the burned gas. Thus, the residue or isolated tail gases remaining are the inert gases only, which may be readily separated for recovery by liquefaction and fractional distillation.

The process is best understood by reference to the accompanying drawings, in which:

Figure 2 is a fragmentary elevation of the burning chamber, condenser and separating tank of the apparatus shown in Figure 1, partly broken away and in section; and Figure 3 is a vertical sectional view of one of the gas expansion chambers forming part of the apparatus shown in Figure 1.

Figure 1:
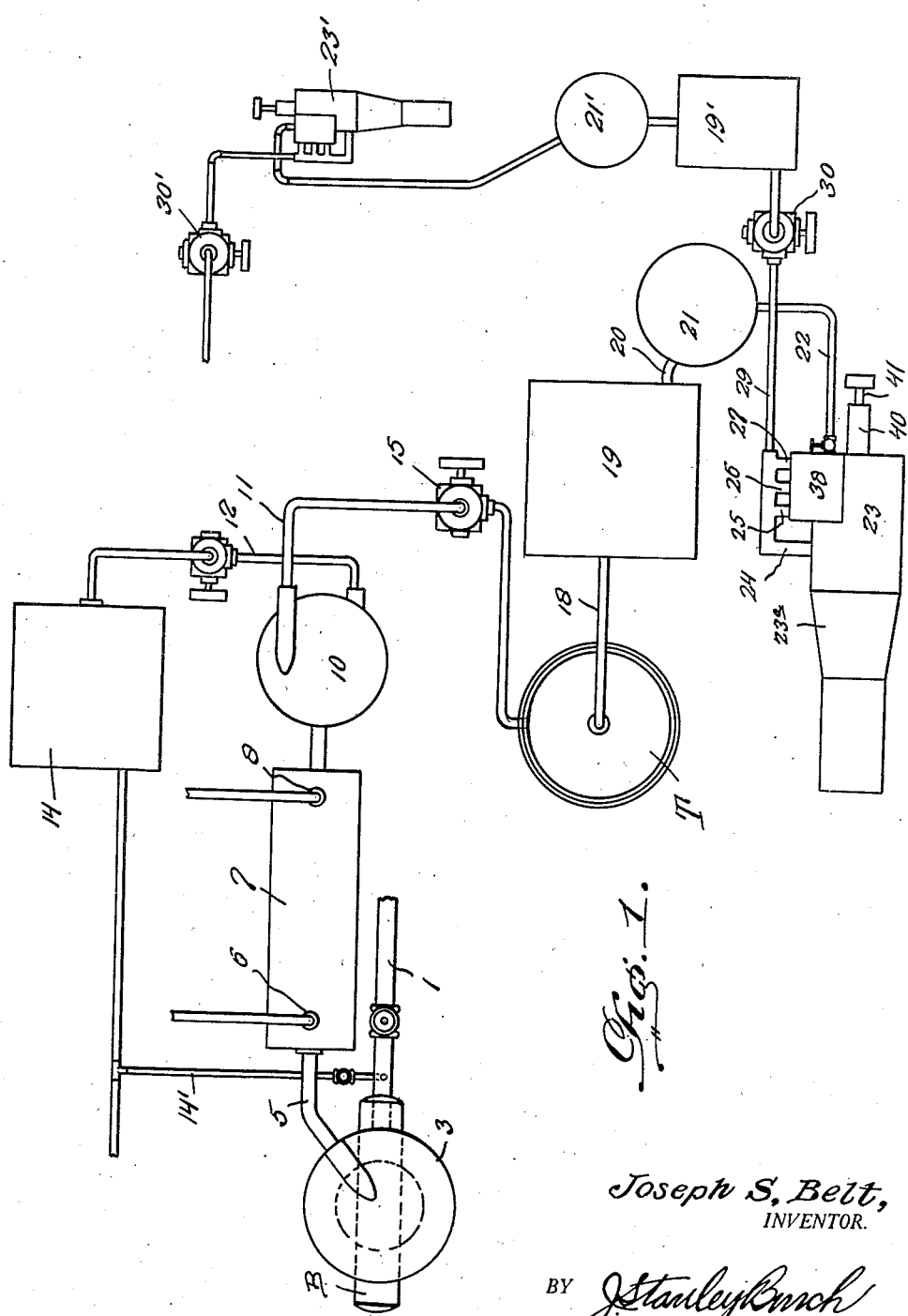
Figure 1 is a diagrammatic plan view of the apparatus or equipment for carrying out the process in accordance with the present invention.

Referring in detail to the drawings, 3 is a burning chamber which is air-tight, and 1 is a natural-gas fuel line leading into the burning chamber 3, while 2 is a gas burner by which the natural gas conducted into 3 by means of 1 is burned. Nothing will burn without oxygen, and the oxygen is supplied by the air when anything is burned in the open. However, to burn the gas inside the air-tight chamber 3, oxygen must be supplied artificially. Therefore, electrolysis plant 14 is used in conjunction with the process by which water is electrolyzed and changed into its constituent gases of oxygen and hydrogen. The oxygen thus obtained is supplied through pipe 14' into the burning chamber to cause the natural gas to burn. An electrolysis plant is necessary because great quantities of oxygen are necessary.

In the burning of the natural gas with oxygen in the chamber 3, by supplying oxygen artificially, great heat is occasioned, much greater than if the gas were burned in the open air. By using a tube boiler B set in the burning chamber, horizontally above the flame, the heat from the burning natural gas can be utilized to provide steam power to operate the present apparatus or plant.

Chemically, the effect of burning natural gas is not to destroy it but merely to change its identity. Therefore, the burning affects only the burnable hydrocarbons and does not affect the inert gases other than to heat them. The effect upon the hydrocarbons is shown by the following chemical equations:

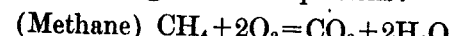
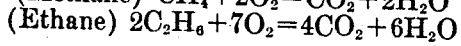

(Methane) $CH_4 + 2O_2 = CO_2 + 2H_2O$
(Ethane) $2C_2H_6 + 7O_2 = 4CO_2 + 6H_2O$ In other words, upon burning the natural gas, the burning causes the dissociation of the hydrocarbon compounds into their respective constituents. The compound of methane breaks up, the carbon combines with twice its volume of oxygen, forming carbon dioxide ($CO_2$), while the hydrogen combines with half its volume of oxygen, forming water. The water formed is, of course, highly vaporized and must be cooled to condense it. Ethane does the same thing. Therefore, the symbol $CO_2$ for carbon dioxide indicates that it is a compound of gases composed of 1 volume or part of carbon to two volumes or parts of oxygen and the symbol $H_2O$ for water indicates its combination of two volumes or parts of hydrogen to one volume or part of oxygen. Hydrogen and oxygen burned together form water vapor, and that is what happens also when hydrocarbons are burned. The hydrogen combines with oxygen forming water vapor which condenses to water. The carbon combines with oxygen forming carbon dioxide. This is merely elementary chemistry and can be readily explained by any chemist, or student or teacher of chemistry.

Therefore, upon burning the natural gas, the hydrocarbon constituents of methane and ethane change their identity by breaking up and recombining, thus forming carbon dioxide and water. The inert or noncombustible gases that are present in the natural gas are unaffected other than being highly heated. Therefore, the chamber 3 must be so constructed as to withstand great heat.

The object of supplying oxygen artificially into the air-tight burning chamber is, of course, to keep from burning the gas in the air, for the air is but 21% oxygen and all the rest of the atmosphere is inert gas. So oxygen is used to keep the inert gas of the air, (which is principally nitrogen), from being mixed with the gases after burning the natural gas.

The burned gases, or residue gases after burning the natural gas in the chamber 3, will contain the original inert gases of the natural gas but the hydrocarbons will be displaced with carbon dioxide, ($CO_2$), and water vapor, ($H_2O$). Being highly heated, their tendency is naturally to rise.

The numeral 4 indicates an opening in the burning chamber 3 in which is inserted or connected, the pipe 5 through which the burned gases are drawn off, and 7 is a heat exchanger or condenser which is nothing more than a series of pipes, or a coiled pipe, inside a water jacket into which cold water or liquid can be pumped at 6 circulating over the pipes or coil, and discharging at 8.

The pipe 5 through which the burned gases are drawn off from the burning chamber 3 connects with the interior pipes or coils of the heat exchanger, and 9 is the discharge pipe from the pipes or coil inside the heat exchanger. The burned gases therefore, pass from the burning chamber 3 down through pipe 5, and through the pipes or coil inside the water jacket of the heat exchanger 7, where they are cooled to 70 degrees Fahrenheit or lower. This, of course, is occasioned by the circulation of cold liquid inside the water jacket of heat exchanger 7 which circulates over and around the inside pipes or coil through which the gases pass from 5 through the heat exchanger. After passing through the pipes or coil employed in the heat exchanger, the burned gases pass out through 9 from the interior of the heat exchanger. The cooling of the gases while passing through the heat exchanger cools the water vapor thrown off or occasioned by the burning, so that when the burned gases reach the discharge point or extremity of 9 the water vapor has been condensed by the cooling in the heat exchanger, and is then liquid water.

Pipe 9 has its extremity protruding inside a tank 10, which we may call the separating tank, for, as the discharge through 9 enters the separating tank 10, the condensed water vapor that has been cooled by passing through the heat exchanger, is then liquid and pours to the bottom of the separating tank. Thus the water that was originally vapor is separated from the burned gases. The gases rise in the separating tank and pass out through pipe 11, and the water may be drawn off at the bottom through pipe 12.

Pipe 11 connects with a pump 15. The pump 15 therefore draws off the gases and vapors, after burning, from 3 down 5 through 7 into 10. The gases pass from 10 through the pump 15 into a storage tank T.

Thus, the above steps in the process are simply to burn the natural gas by supplying oxygen to burn it in an air-tight burning chamber, to transport the volume of gases and vapor that result from the burning through a heat exchanger as a means to cool them and condense the vapors to liquid water which separates itself upon discharge of the volume into 10, and to draw off the burned gases less the condensed water and store them.

The water is saved because it is pure or substantially pure water, and pure water is a big factor in electrolysis of water to decompose water into its constituent gases of oxygen and hydrogen, and much water will have to be electrolyzed to supply an adequate amount of oxygen for this process. The average good grade of natural gas when so burned and handled will provide approximately $\frac{1}{3}$ of the amount of pure water necessary to electrolyze for the oxygen to burn it. In other words, ordinarily good fuel gas upon burning 1,000 cubic feet will give off enough pure water recoverable in the process step mentioned to yield, upon electrolysis, $\frac{1}{3}$ the required oxygen to burn 1,000 cubic feet of fuel gas. The other $\frac{2}{3}$ of the water required for electrolysis will have to be distilled or obtained by condensing steam to obtain the required purity.

Of course, the tube boiler horizontally arranged across the burning chamber will provide enough steam for condensing water to electrolyze and also provide enough steam power to practically run the entire plant.

Thus far we have burned the natural gas, separated from it the water given off by the burning, and stored the dry burned gases in the gasometer T.

The burning has changed the hydrocarbon compounds to carbon dioxide and water vapor. The water vapor has been condensed and thus separated from the gas. Therefore, instead of the original natural gas we now have in the gasometer T, the carbon dioxide occasioned by the burning, with which is mixed the inert gases originally in the natural gas. Instead of the original natural gas we have all the nitrogen etc., or the inert gases originally in the natural gas, but, instead of the hydrocarbons, we have carbon dioxide.

Just how much carbon dioxide we have now depends of course upon analysis of the natural gas. In as much as the burning qualities of the natural gas are methane and ethane, the yield of carbon dioxide is 1 cubic foot of carbon dioxide for each cubic foot of methane burned and 2 cubic feet of carbon dioxide for each cubic foot of ethane burned. Therefore, methane always being the greatest hydrocarbon by volume, and assuming that the natural gas was originally 72% methane and 18% ethane, we displace the hydrocarbons upon burning 100 cubic feet of natural gas, with 108 cubic feet of carbon dioxide which is given off by the burning. Assuming also, to illustrate further, that this natural gas was 10% inert gases by volume, we now have in the gasometer T, after burning 100 cubic feet of the natural gas, 108 cubic feet of carbon dioxide plus the 10 cubic feet of inert gases originally in the natural gas.

Now from the gasometer T through pipe 18, this volume is conducted into a liquefaction unit 19. Gases are liquefied by cooling to their critical temperature, or below, and subjecting them to pressure.

Carbon dioxide will liquefy readily at 0 centigrade under 505 pounds pressure per square inch; also at −20 C. at 285.7 pounds; at −30 C. under 207 pounds; at −40 C. under 146 pounds; at −50 C. under 99.20 pounds, and at −56 C. under 75.18 pounds per square inch. But nitrogen, helium, argon, krypton and any inert gases originally in the natural gas and which is now mixed with the carbon dioxide after the burning, will not liquefy at any of these temperatures and pressures. Consequently, in liquefying the carbon dioxide, the inert gases are not liquefied. However, the liquid carbon dioxide will dissolve a considerable quantity of these inert gases. Just how much it will dissolve is an unknown quantity but, upon liquefaction of the carbon dioxide, the liquid carbon dioxide together with the inert gases are pumped off through pipe 20 into a liquid tank 21.

It is long known that liquid carbon dioxide when expanded through a 2 millimeter pipe or jet, (that is a coil 2 millimeters in diameter) and permitted to escape from the coil (or tube, as the case might be) into a chamber, the expansion and evaporation of the liquid gas causes a portion of it to freeze to a solid or snow. The lower the temperature of the liquid carbon dioxide being employed or used, the greater is the efficiency of its freezing or producing the snow upon expansion and evaporation when discharged into a suitable chamber through the 2 millimeter pipe or jet. Therefore it is advisable, for efficiency in producing the solid carbon dioxide to employ temperatures as low as −56 C. Also, the lower the temperature at which it is liquefied the lesser is the vapor pressure exerted by the liquid gas. Another advantage in using lower temperatures is to get the maximum coldness of liquid carbon dioxide exerted upon the inert gases dissolved therein and that, if any, not dissolved but present in the liquid tank with the liquid carbon dioxide so that when the liquid is discharged through the 2 millimeter pipe or jet, inert gases present and dissolved in the liquid escape with it. Thus the low temperatures which the inert gases have reached because of the liquid carbon dioxide lend an added coldness upon escaping into the expansion chamber and lend greater efficiency or a cooling power to the discharging liquid carbon dioxide which causes a greater amount of the carbon dioxide to freeze to a snow or solidify.

A simple experiment is readily available by highly inflating an automobile tire. Then open the valve. The escaping air from the valve is much colder than the atmosphere. That is simply because of the escape of air through the small orifice of the valve and its rapid expansion upon its escape. Thus, the inert gases upon escaping into the expansion chamber with the liquid carbon dioxide reach a temperature as low as the freezing point of carbon dioxide which helps to freeze the carbon dioxide into snow or a solid.

Referring to Figures 1 and 3 we will consider the construction of the expansion or separating chamber into which the liquid carbon dioxide is conducted from the liquid tank 21 through pipe or expansion jet 22. In large plants a number of these 2 millimeter pipes or jets will be necessary, but for the purpose of this detail we refer to only one.

Referring to the expansion chamber in Figures 1 and 3, 23 is the shell or jacket, and 24 an exhaust vent for dry gas and inert gases. A portion of the liquid carbon dioxide when expanded or discharged through the expansion pipe or jet 22 will evaporate back to dry gas, thus producing the temperatures low enough to freeze or solidify a portion of it. Some of this, together with some inert gases discharged with the liquid will exhaust itself out through vent or exhaust pipe 24. At 25, 26, and 27 are exhaust vents for the gas trap 38 which is fitted over a portion of the shell or jacket of the expansion chamber 23 as illustrated in Figure 3. The shell or jacket of expansion chamber 23 is cut away under gas trap 38 the portion cut away is replaced by a closely woven screen 39 with heavy canvas plied over and upon the screen. The dry carbon dioxide occasioned by evaporation of the liquid carbon dioxide, together with the inert gases, pass up through this screen and canvas which acts as a filter to keep the snow or solid carbon dioxide from blowing out and also to regulate the expansion and prevent too rapid a discharge of gases from the expansion chamber. Were it not for this filtering feature the escape of gas would be so rapid that little of the gas would be frozen to a solid. The same means may be employed in the lower extremity of vent 24. A screen is not necessarily essential, as two or more plies of 10 ounce canvas between metal grating or perforated metal sheets will do as well. At 40 is a bearing in which rotates the shaft 41 of the auger conveyor 42. The conveyor 42 is so rotated that as the snow or solid carbon dioxide accumulates within the expansion chamber 23, it is carried forward and accumulates in front of the auger conveyor at L, being pushed steadily forward. The proportions of the jacket of expansion chamber 23 are diminished as at 23a forward of the conveyor auger 42 so that the accumulating bulk of solid carbon dioxide pushed constantly forward by auger 42 must pass through a smaller orifice or space before emerging at the extremity of chamber 23 at M. This necessarily causes the solid carbon dioxide to pack and to be compressed to hard form as it is forced forward and out at M. Being protruded as a continuing compressed solid, the solid carbon dioxide may be cut off in any desired lengths as it is protruded at M. By producing the solid carbon dioxide in the process as described, we have eliminated from the burned gases, most of the carbon dioxide.

The carbon dioxide that evaporates back to dry gas from the liquid without solidifying, together with the accompanying inert gases, as before stated, exhaust through vents 24, 25, 26, 27 after entering the trap or chamber 38, from which they are drawn off through pipe 29 by means of a pump 30 to which pipe 29 is connected. This volume of carbon dioxide gas and inert gases may then be conducted into an auxiliary or secondary liquefaction unit 19′ and tank 21′ and reexpanded into an auxiliary or secondary expansion chamber 23′ in identically the same manner as before. However, the volume being greatly reduced by the first operation, the second operation is on a much smaller scale. Upon this second operation, practically all of the carbon dioxide has been converted to a solid and obtained in the form popularly known as dry ice. Therefore, with this done, the inert gases remain with but a very slight amount of carbon dioxide.

From the above description, it will be seen that the present invention provides a simple and efficient process and means for producing solid carbon dioxide from natural gas, which solid carbon dioxide or dry ice may be used to advantage for many cooling and refrigerating purposes. It will also be seen that the carbon dioxide is used to advantage and effectively eliminated for permitting recovery and separation of the inert gases, while the latter are utilized to assist in solidifying and therefore eliminating the carbon dioxide.

Modifications may obviously be made in the details of construction, arrangement and procedure without departing from the spirit of the invention as claimed.

What I claim as new is:

1. Carbon dioxide snow-forming apparatus, including a snow-forming jet and a separating chamber into one end of which said jet discharges, said separating chamber having a screened top outlet and a discharge pipe for the separated gas escaping through the screen, the other end of said chamber being contracted and forming a restricted outlet for the snow, and means in said chamber for continuously pushing the snow toward said outlet as it forms in said chamber, whereby the snow is protruded in compressed form, said last named means acting to continuously clear the snow from said screen and thereby facilitate the escape of the separated gas.

2. Apparatus for making carbon dioxide snow, including a discharge jet, means for supplying said jet with cooled and compressed carbon dioxide at a temperature and pressure to effect solidification of much of the same when released from pressure, and a separating or expansion chamber into which said jet discharges, said separating chamber having a contracted outlet end for the snow and a screened top outlet for the separated gas, and means to force the snow from said screened gas outlet and toward said contracted outlet end.

3. The process of producing solid carbon dioxide, which consists in continuously releasing from pressure within a chamber a compressed and cooled solution of liquid carbon dioxide and gaseous nitrogen so that part of the carbon dioxide is solidified, forcing the solid carbon dioxide from the chamber as it is produced therein, and permitting continuous restricted escape of the resulting unsolidified carbon dioxide gas and nitrogen from said chamber.

4. The process of producing solid carbon dioxide, which consists in continuously releasing from pressure within a chamber a compressed and cooled solution of liquid carbon dioxide and gaseous nitrogen so that part of the carbon dioxide is solidified, forcing the solid carbon dioxide from the chamber as it is produced therein, and permitting continuous restricted escape of the resulting unsolidified carbon dioxide gas and nitrogen from said chamber, then compressing and cooling the escaping carbon dioxide gas and nitrogen to liquefy the former, then releasing the resulting solution and mixture of liquid carbon dioxide and nitrogen from pressure within a second chamber so that most of the carbon dioxide then remaining is solidified, forcing the solid carbon dioxide from the second chamber as it is produced therein, and permitting restricted escape of the nitrogen from said second chamber.

5. The process of producing solid carbon dioxide, which consists in expanding under constant pressure within a chamber of constant size a compressed and cooled solution of liquid carbon dioxide and gaseous nitrogen so that part of the carbon dioxide is solidified, forcing the solid carbon dioxide from the chamber as it is produced therein, and permitting restricted escape of the resulting unsolidified carbon dioxide gas and nitrogen from said chamber.

In testimony whereof I affix my signature.

JOSEPH S. BELT.